United States Patent [19]
Shahid

[11] Patent Number: 5,620,634
[45] Date of Patent: Apr. 15, 1997

[54] METHOD OF MAKING FIBER WAVEGUIDE CONNECTORS

[75] Inventor: Muhammed A. Shahid, Ewing Township, Mercer County, N.J.

[73] Assignee: Lucent Technologies Inc., Murray Hill, N.J.

[21] Appl. No.: 516,473

[22] Filed: Aug. 17, 1995

[51] Int. Cl.⁶ .................................................. B29D 11/00
[52] U.S. Cl. ................ 264/1.25; 29/407.09; 29/465; 29/466; 29/467; 264/2.5; 264/219; 425/808
[58] Field of Search ........................... 29/464, 465, 466, 29/467, 468, 407; 264/1.25, 2.5, 219; 425/808

[56] References Cited

U.S. PATENT DOCUMENTS

| | | | |
|---|---|---|---|
| 3,228,262 | 1/1966 | Bennett | 29/465 |
| 3,768,146 | 10/1973 | Braun et al. | 29/467 |
| 4,028,162 | 6/1977 | Cherin et al. | 29/467 |
| 4,341,008 | 7/1982 | Graboyes et al. | 29/467 |
| 4,359,915 | 11/1982 | Nascimento | 29/465 |
| 4,555,840 | 12/1985 | Nakamura | 29/465 |
| 4,818,058 | 4/1989 | Bonanni | 385/71 |
| 5,343,544 | 8/1994 | Boyd et al. | 264/1.1 |
| 5,441,397 | 8/1995 | Eriksen et al. | 264/1.28 |
| 5,526,454 | 6/1996 | Mayer | 264/1.25 |

*Primary Examiner*—Mathieu D. Vargot

[57] ABSTRACT

The specification describes a fiber lightguide connector for interconnecting large arrays of lightwave fibers. Linear arrays of lightwave fibers, for example those in so-called ribbon cables, are effectively interconnected using known v-groove connector assemblies. According to the invention two or more such v-groove connector assemblies are stacked to increase the fiber capacity of a connector assembly. Attempts to stack known v-groove connector plates have encountered problems with aligning the v-groove arrays on opposite sides of the internal or intermediate plate of the stack. An alignment technique is described for assuring precise alignment between linear arrays of v-grooves on opposite sides of the interior plates of stacked linear array connectors.

6 Claims, 4 Drawing Sheets

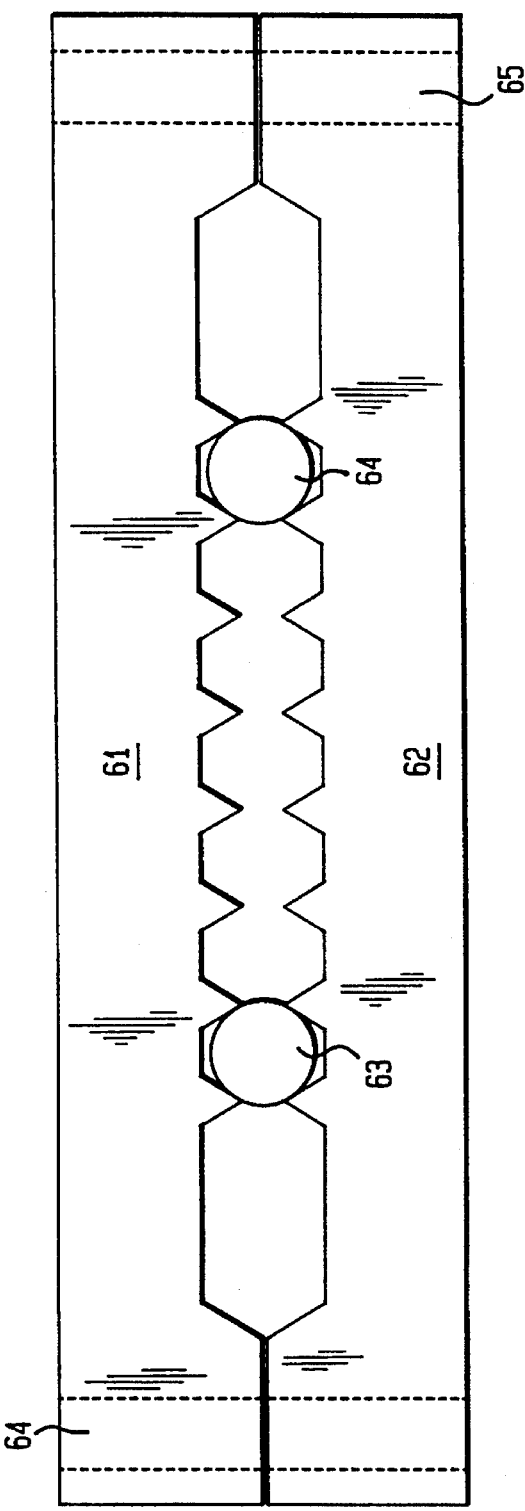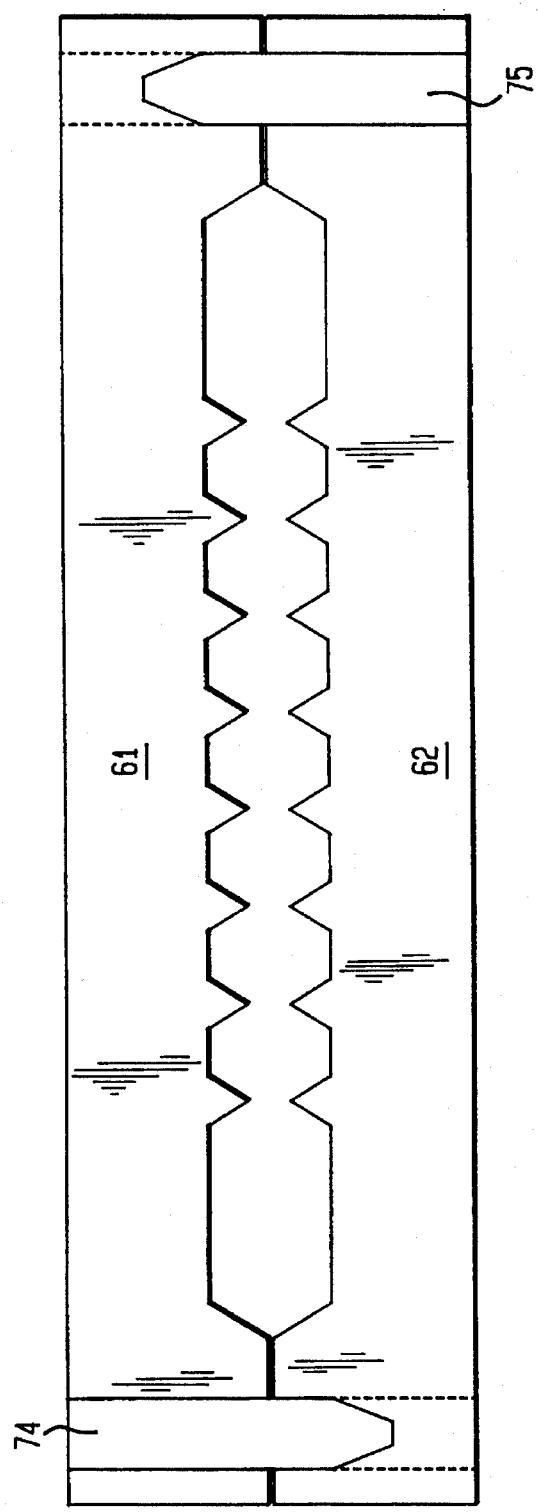
FIG. 6
FIG. 7

METHOD OF MAKING FIBER WAVEGUIDE CONNECTORS

TECHNICAL FIELD

The invention is a method for making large array fiber waveguide connectors in which linear arrays, often referred to as ribbon arrays, of fiber waveguides are stacked to increase the number of fibers contained in a single connector assembly.

BACKGROUND OF THE INVENTION

The discovery that ultra-high purity glass fibers are efficient and effective transmitters of light signals over long distances has stimulated a broad and sophisticated technology. The glass fiber waveguide itself, as a transmission medium, has become a standard commodity, in much the same way as copper wires became in an earlier generation, but the methods and systems for interconnecting fiber waveguides continue to evolve. Glass fiber interconnection techniques are significantly more demanding than copper wire connectors due in part to the requirement that glass fibers must be connected end to end, and connected with a precision sufficient to exactly align very small fiber waveguide cores to within a few microns, and often within a fraction of a micron. Because fiber waveguides are capable of carrying enormous quantities of information, relative to copper wires, fiber waveguide cables to date typically require only a relatively few number of fibers to match or even exceed the capacity of large bundles of wires in copper cables. However, with the increasing capacity demanded by current and future data and multimedia transmission networks, the number of fibers in a single transmission cable continues to grow.

The end to end high precision connection requirement of fiber waveguides precludes simply bundling of large numbers of individual fibers in a cable as was the practice with copper wires. Instead the multiple fibers are organized in a high precision, fixed, spatial relation. A common approach for such arrays are ribbon cables in which a plurality of fibers are organized and molded side by side in a plastic ribbon. Connectors used to interconnect these ribbons are typically made of metal or silicon plates in which high precision v-grooves are etched with high precision parallel grooves. The fibers are placed side by side in one such grooved bottom plate and another mating v-groove plate is placed over the top of the linear array. The top and bottom plates of the connector are assembled together with clamps or an adhesive.

While ribbon connectors are capable of very high transmission capacities there is a need for even greater capacity. An approach for addressing this is to stack fiber waveguide ribbons. The interconnection for such stacked arrays requires a similarly stacked connector, which presents new problems in precisely aligning the fiber waveguides in the added or stacking dimension.

It has also been recognized that the use of silicon or metal plates in v-groove connectors contributes to a relatively high cost connector. Silicon was originally the material of choice since v-grooves can be formed in silicon with high precision and reliability using crystallographic etch techniques. Significant cost reductions have been proposed by substituting relatively inexpensive plastic materials for silicon. However, there is no corresponding crystallographic etch mechanism if a plastic material is used. The proposals anticipated that v-groove connector parts could be molded or extruded using dimensionally stable plastic materials, and these would provide adequate precision for the connector. These proposals have been successfully implemented, but precision in the alignment of fibers remains an issue, especially as the size and complexity of the connectors grows.

STATEMENT OF THE INVENTION

The invention is a method for making stacked array fiber waveguide connectors. More particularly the invention involves a technique for precisely aligning two or more stacked v-groove connectors in the vertical or stacking dimension. According to the invention an empirical alignment technique is incorporated into the molding process. This is achieved by using two alignment steps. The first step is to place alignment members in two mating v-groove die plates. At this stage in the 10 process, prior to any molding, precise alignment of v-groove linear arrays in the vertical dimension is ensured. Having fixed the proper vertical alignment, alignment holes are drilled through the mating v-groove die plates. The alignment holes accommodate an alignment pin that will be used for alignment during the actual precision molding process. The alignment members are removed, either before or after insertion of the alignment pins, and the precision connector piece is molded with the alignment pins in place. Thereafter, precise alignment of the v-grooves is ensured when the mold is opened and reassembled during subsequent molding operations.

BRIEF DESCRIPTION OF THE DRAWING

FIG. 6 is a cross section view of a die cavity for extruding the intermediate piece part of the connector of FIG. 2 showing the alignment means for establishing alignment of the two halves of the cavity;

FIG. 7 is a cross section view of the die cavity of FIG. 5 ready for filling with molding compound;

DETAILED DESCRIPTION

Figure 1:
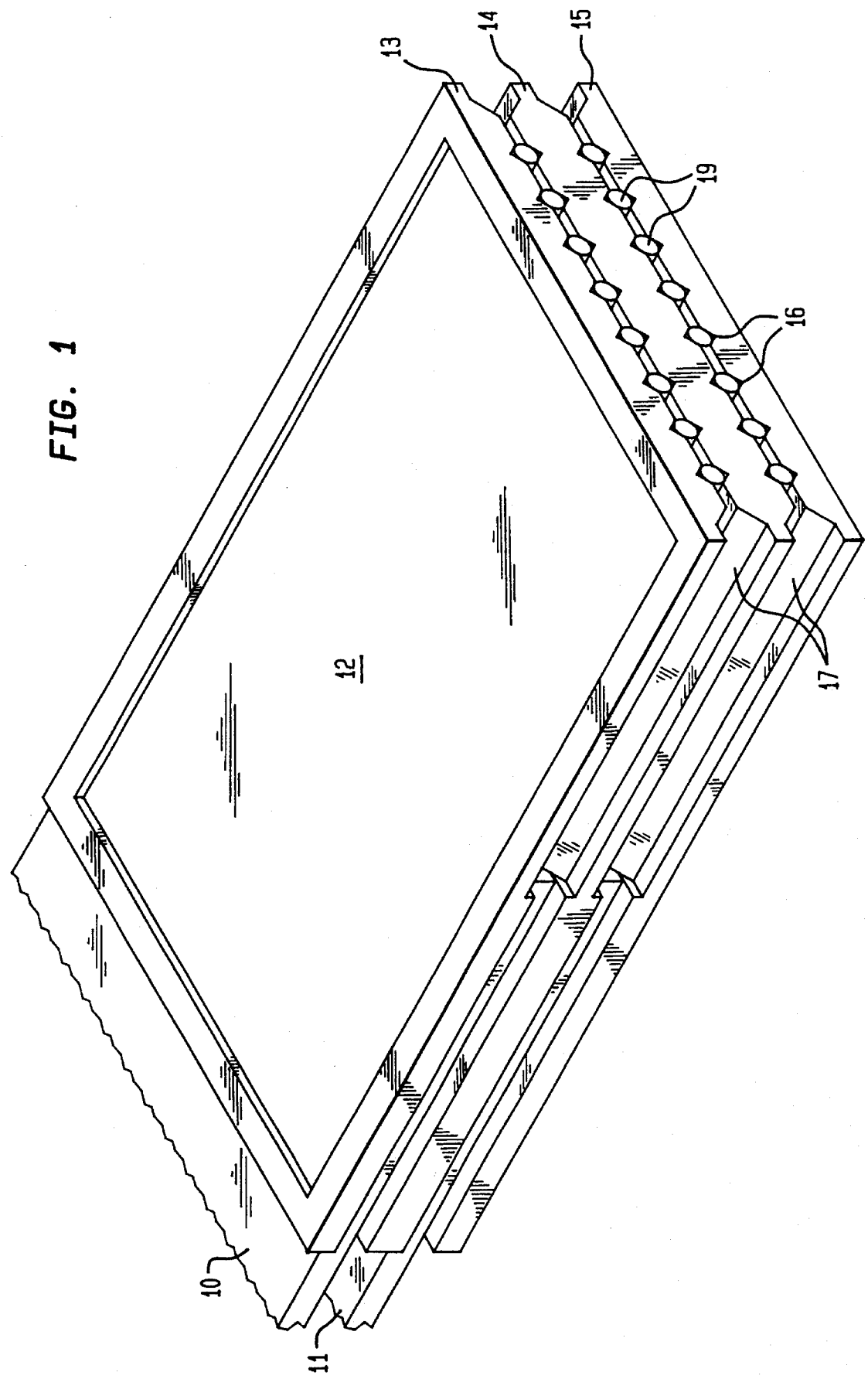
FIG. 1 is a side perspective view of a multifiber array connector interconnecting two linear array multifiber cables.

Referring first to the connector shown in perspective in FIG. 1 two ribbon cables are shown at 10 and 11, with the connector assembly shown at 12. The connector assembly is formed in three, essentially planar, fiber retaining members 13, 14 and 15. Each of the fiber retainer members 13, 14 and 15 contain v-grooves 16 for positioning the fibers 19 in precise alignment with respect to one another. The connector assembly includes slots 17 adapted to accommodate alignment and retaining members 18 that appear in phantom in FIG. 2.

Figure 2:
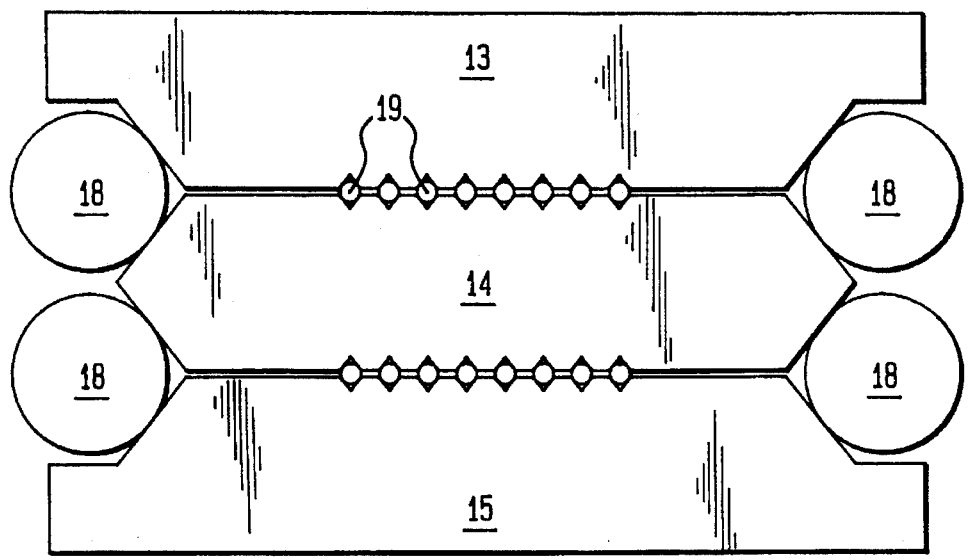
FIG. 2 is a cross section view of the multifiber array connector of FIG. 1 taken through 2—2.

FIG. 2 is a cross section taken through 2—2 of FIG. 1 and shows the v-grooves 16 in greater detail. Within the v-grooves are fibers 19 which have been stripped of the polymer in the Figure. Alternatively the fibers may be incorporated into the connector with the plastic coating intact. However, because the outer dimension of the coating typically has less dimensional control than the outer dimension of the cladding it is generally preferred to strip the fibers prior to placing them in the v-grooves. Also shown in FIG. 2 are slots 17 that are adapted to engage alignment and retaining pins. The alignment and retaining pins are incorporated in a mating connector part shown at 30 in FIG. 3. The mating connector part is identical to the part appearing in FIGS. 1 and 2 except for the retaining pins, designated 18. As will be evident, one part of the completed connector has pins, and the other slots to engage the pins.

Figure 3:
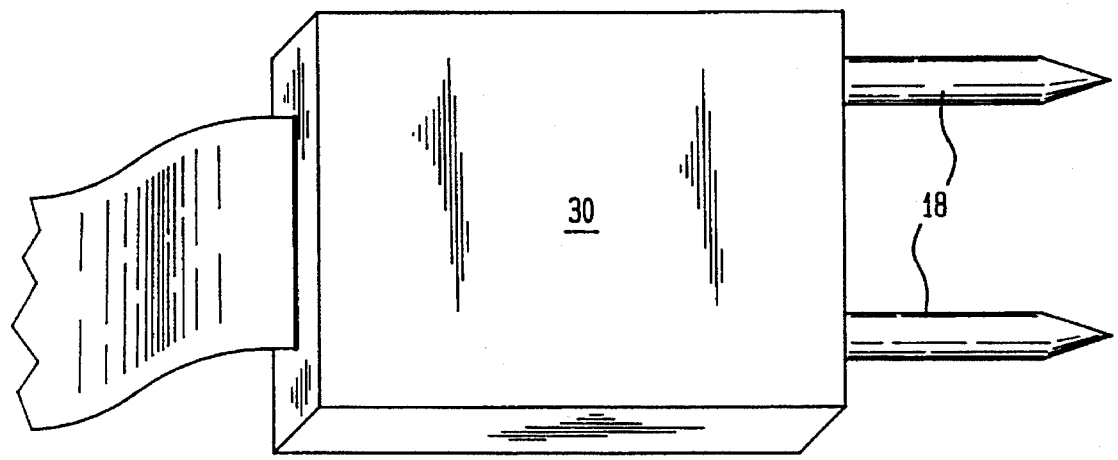
FIG. 3 is a perspective view of the mating half of the connector showing the means for connecting two multifiber connector ends together.

The connector halves shown in FIGS. 2 and 3 also typically have additional means for interlocking the halves together. Such means do not form any part of this invention but a suitable spring clip interlocking arrangement is shown and described in U. S. Pat. No. 4,818,058, granted Apr. 4, 1989 to Bonanni.

As will be evident from an examination of FIG. 2 it is essential that the v-grooves are made with precision and that the grooves in each of the plates 13,14 and 15 of the assembly are aligned with the grooves in the adjoining plate. The fibers 19 are typically 125 microns in diameter so a v-groove structure that accommodates such fine elements must meet rigid dimensional specifications, and is prone to misalignment if the v-grooves in the plates 13,14 and 15 are not in exact mating relationship.

The connector halves shown in FIGS. 1 and 2 have a slight gap between them. The reason for the gap is that the space allowed in the v-grooves of mating connector parts is intentionally made smaller than the diameter of the fibers so that the fibers are under pressure from the connector parts, and are firmly gripped in the connector. If desired the connector halves can be made to mate together without pressing on the fibers, but it is preferable that the fibers not be loose within the connector. Thus the choice of a gap preserves the aforementioned grip on the fibers even in the case where there is a variation in the diameter of the fibers.

In a typical case the width of the v-groove, measured from the maximum (i.e. at the top of the groove) is approximately 140 microns, and the diameter of the fiber is approximately 125 microns, leaving a gap between the connector parts of approximately 18.6 microns. For the surfaces of the connector parts to exactly touch, the diameter of the fiber would be 114.25 microns. In the preferred case the gap is in the range of 10 microns to 30 microns.

The manufacture of a stacked multifiber connector, e.g. one that connects two or more ribbon cables, presents a unique problem when contrasted with a single ribbon cable connector. In the latter case both v-groove members can be made from the same mold thus ensuring precise registration between the v-grooves in both halves of the connector. For illustration, consider the case in which plate 14 is removed from the connector assembly of FIG. 2. Plates 13 and 15 can be made identical so that the v-groove arrays are identical and there is no mis-alignment problem. However, when two or more rows of v-grooves are required in order to make a stacked multifiber array cable, the intermediate plate 14 poses the problem of precisely aligning the V-grooves on one side of the plate with those on the other. To better illustrate the problem, consider the molds used to make parts 13, 14, and 15.

Figure 4:
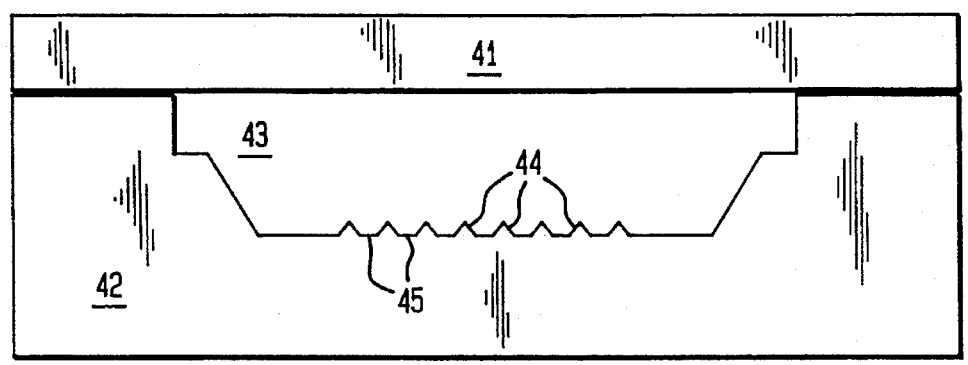
FIG. 4 is a cross section view of a die cavity useful for extruding the v-groove parts end parts of the multifiber linear array cable of FIG. 1.

In FIG. 4 an injection mold cavity is shown for molding a part similar to top plate 13 or bottom plate 15. The figure shows mold plates 41 and 42 forming an elongated rectangular cavity 43, with a plurality of v-shaped ridges 44 extending parallel to one another along the length (the z-dimension in FIG. 4) of the cavity. The ridges are spaced from one another at a uniform distance leaving a series of planar gaps 45 between the ridges. The ridges have essentially the shape of an inverted "v" to produce a v-groove as the inverse replica on the finished part.

The injection molds are typically made from master molds which are high precision replicas of the actual parts being made. The master may be made, for example, from single crystal silicon, and the v-grooves etched by known photolithographic masking techniques and known crystallographic etch processes that form very precise grooves. These known techniques have been perfected in the silicon integrated circuit technology and, while very effective in the application described here, form no part of this invention. The nickel mold that is made by electroforming from the silicon master is an inverse replication of the grooved silicon structure and can be used as the mold to form parts such as 13, 14 and 15. Other techniques for manufacturing the master molds are also suitable such as mechanical micromachining. Other methods for forming the inverse replica can be used such as chemical vapor deposition or electroless plating. Techniques other than injection molding for creating the connector parts of this invention are also available. Among these are compression molding and as die stamping.

Figure 5:
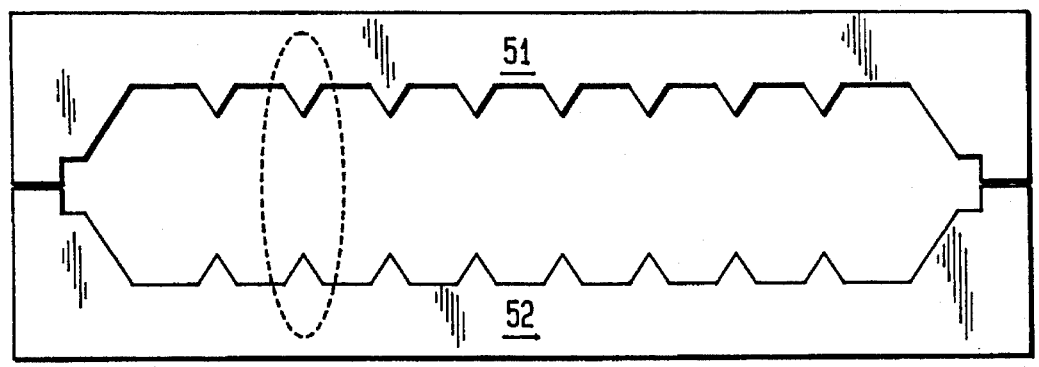
FIG. 5 is a cross section view of a die cavity for extruding the intermediate piece part of the connector shown in FIG. 2, and depicting the effect of offset or misalignment of one of the mold plates relative to the other.

As is evident from FIG. 2 the parts 13 and 15 are typically very similar, and can be identical. Accordingly, both parts can be made from the same mold, or from molds made with the same master. During molding of connector parts, the two halves of the mold 41 and 42, are typically carefully registered but the registration is not critical since there are no critical features on the top half 41. Contrast this with the mold shown in FIG. 5 for molding part 14, the intermediate plate of connector 12. Here the critical features, e.g. the v-grooves and the spacing between the v-grooves, can be replicated precisely on both halves 51 and 52 of the mold, but precise alignment between the critical features when the mold is opened and closed is not necessarily assured. FIG. 5 illustrates, for example in the region circled, the potential for misalignment. A slight offset of plate 51 with respect to plate 52 will result in a useless attempt to form part 14 because the v-grooves cannot later register with the v-grooves in both the upper and the lower plate (13 or 15). To assure critical alignment between the v-grooves on both sides of the resulting injection molded intermediate plate, and in accordance with the method of the invention, the following alignment procedure is followed.

First, and with reference to FIG. 6, a primary alignment step is made by inserting at least two primary alignment dowels, shown here as 63 and 64, in at least two of the v-grooves. A single dowel can be used if desired but at least two are recommended. More than two dowels can also be used. If two dowels are used it is recommended that they be placed substantially apart, i.e. in v-grooves that are separated by other v-grooves. The dowels are preferably cylindrically shaped, however it is possible to use rods with other cross sections. A many-sided polygon cross section for example could form the equivalent of a cylindrical shape. The two pieces of the mold, 61 and 62, are then temporarily mated together as shown. Thereafter, alignment registration means, which are here shown as holes 64 and 65, are drilled or otherwise formed through both halves 61 and 62 of the mold.

The two parts of the mold are then separated sufficiently for the alignment dowels to be removed, and the mold is again mated together as shown this time in FIG. 7. At this point secondary alignment pins 74 and 75 are inserted into the holes 64 and 65. The mold parts 61 and 62 are now precisely registered and the mold is ready to be used for manufacturing connector parts.

The completed mold is then used in a conventional way to mold connector parts like part 14 of FIG. 2. It has been found that highly filled polymers such as polyphenylene sulfide and liquid crystal polymers, both known in the art, provide good dimensional stability and low shrinkage during the molding operation. While these materials exhibit low shrinkage, dimensional changes during the molding operation are still finite, and it is recommended that the size (volume) of the mold be deliberately oversized to compensate for the shrinkage. In the case of polyphenylene sulfide the increase should be about 0.4%. Known epoxy adhesives can be used for mating together the molded connector parts.

Although two holes 64 and 65, and two pins 74 and 75 appear in the schematic cross section of FIG. 7, any number of alignment holes and alignment pins may be used. For example two pairs of alignment holes and alignment pins, spaced approximately at the corners of a square, can be used. The use of alignment holes and alignment pins is a preferred means for effecting registration between the mold halves, but other means may be chosen by those skilled in the art. The pins are shown here is removable, but they may also be installed permanently. The holes are shown through both halves of the mold but they need only extend part of the distance through the second mold half.

The primary alignment step described above is a key step in the molding process. Although the means for achieving the primary alignment are shown here as dowels, i.e. cylindrical bodies, other shapes may be used instead. For example, elliptically shaped alignment pins may offer an advantage in some cases in that the use of an elliptical cross section allows the ratio of the spacing between the plates 61 and 62 to the lateral separation of the grooves to be larger than would be the case using alignment pins with a circular cross section thus giving more design flexibility. The term dowels as used herein is intended to define elongated pins with a variety of possible cross section shapes.

The primary alignment members perform at least four important operations in aligning the upper mold piece with respect to the lower mold piece. Assuming the pieces are plate shaped having major x- and y- axes, the dowels preserve alignment (tilt) in both the x- and y- directions. They also ensure a proper z-direction spacing, which results in a precise and uniform spacing between the sets of v-grooves in the finished piece. Finally, and significantly, the primary alignment dowels ensure that the points of the v-grooves are precisely opposite to one another, resulting in v-grooves that are precisely registered from the top side of the resulting part 14 to those on the under side.

For the primary alignment means, in the preferred case, the dowels are chosen to have a diameter that approximates the spacing between the two mold sections as measured at respective points between the v-grooves. This is to ensure that the alignment dowel engages the two sidewalls of adjacent v-groove ridges during the primary alignment operation. The preferred dimensional requirements will be specified in relation to the dimensions shown in FIG. 8.

Figure 8:
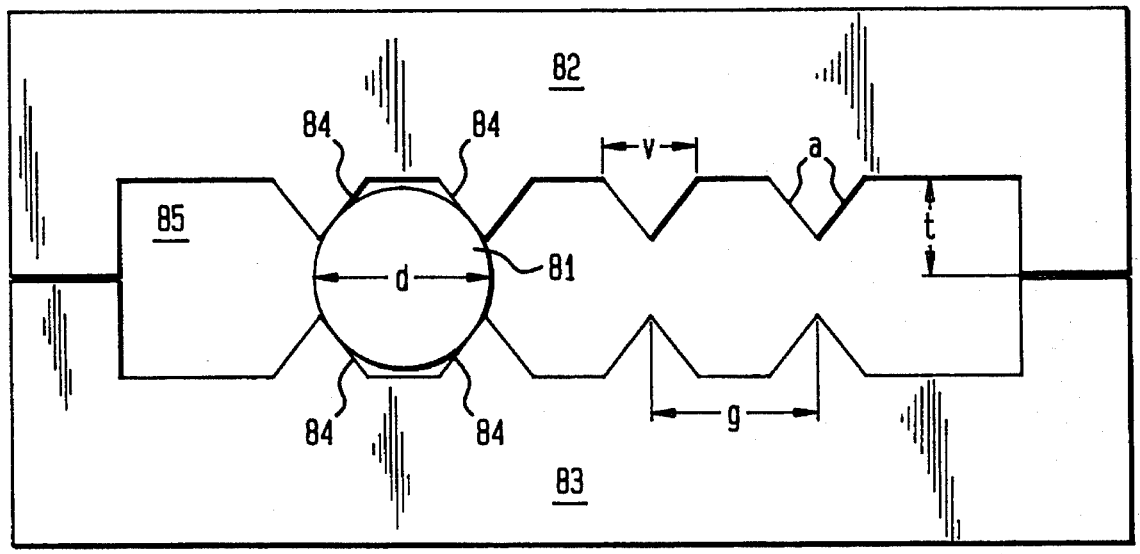
FIG. 8 is a schematic representation of the mold cavity of FIG. 6 showing dimensions that have optimum values according to preferred embodiments of the invention.

FIG. 8 is a schematic representation of one primary alignment dowel 81 shown between two mold plates 82 and 83 and engaging the sidewalls of two adjacent v-shaped ridges 84 on both halves of the elongated rectangular cavity 85. To describe the optimum dimensional relationships for the invention the diameter of the dowel 81 is designated d, and the thickness of the elongated rectangular cavity 85 on each half of the mold is designated t, The angle of the v-grooves is designated a, the width of the grooves is designated v, and the nominal distance between grooves is g.

Using these designations it is preferred that the diameter d of the primary alignment dowels should exceed or approximate the separation between planar portions of the two halves of the mold, i.e. the dimension 2t. If the dowel is made from a material that is somewhat compressible then the nominal diameter of the dowel could exceed 2t and still be effective. If the dowel is elliptical, as suggested earlier, then the diameter of the dowel in the larger dimension of the ellipse would approximate 2t. In most cases it is preferred that d equals 2t plus or minus 20%.

It is preferred that the separation g between grooves be approximately equal to the diameter of the coated fiber, i.e. typically 250 microns.

Recognizing that 2t determines the thickness of the molded part 14 it is preferred that this dimension be a 1x to 8x multiple of the separation between adjacent grooves. In the preferred case where that separation is approximately 250 microns that range becomes 250 microns to 8000 microns. The angle $\alpha$ of the v-grooves is typically 70.5 degrees, which is the angle resulting from the crystallographic etching technique referred to above. If another technique is used to form the master dies then the angle a may vary from this value. The diameter of the primary alignment dowels d should approximate the separation between halves of the mold, i.e. should be approximately 2t.

While the multifiber cables in the drawings above are shown with eight v-grooves to accommodate up to eight fiber waveguides the size of the cable and the number of fibers can be varied as desired. This invention is applicable to connectors having as few as two v-grooves. However, typically, fiber cables have several fibers and the invention was made to solve problems in cables with high fiber count, i.e. six or more fibers in each planar series of v-grooves. The connector shown in FIGS. 1 and 2 has two stacked plates, but more can be added to accommodate large arrays of fibers. An advantage of stacking the connectors is that arrays can be added or subtracted in a main connector assembly as desired. Also one linear array can be modified or repaired without disturbing another linear array.

The invention has been described in terms of v-grooved fiber support structures. The v-groove structure is commonly used and is convenient because of the aforementioned method (crystallographic etching) sometimes used to form the silicon master dies for these parts. However, on examination of the v-grooves with the fibers in place, e.g. see FIG. 2, it becomes evident that the grooves do not have to be exactly v-shaped. For example, since no part of a round fiber reaches the bottom of the v it is obvious that the v-groove can be truncated and still serve the function desired. A truncated v-groove array with fibers in place would resemble the arrangement shown in FIG. 6, where 63 and 64 would be fibers in place of alignment members and 61 and 62 would be connector parts in place of mold parts. The comparison is schematic only to show a truncated form of v-groove. The term v-groove or v-grooves used in this specification and in the appended claims is intended to include such modifications in groove shape.

Various additional modification and deviations of the invention as described may occur to those skilled in the art.

All such variations which basically rely on the principles and techniques through which this invention has advanced the art are to be considered within the scope of this invention, and within the scope of the appended claims and any equivalent thereof.

I claim:

1. A method for the manufacture of a fiber waveguide cable connector part by molding the connector part from a mold having at least two plates, two plates of which are essentially replicas of each other, and each plate having a hollowed portion having a mold pattern formed therein with the hollowed portion of each plate adapted to form a mold cavity when the plates are mated together, the mold pattern of each plate comprising an elongated rectangular cavity, and a plurality of essentially v-shaped ridges extending parallel to one another along the length of the cavity and leaving elongated planar gaps between the edges of said v-shaped ridges, placing a first primary alignment dowel in a first of said gaps, placing a second primary alignment dowel in a second of said gaps, said second gap being separated from said first gap by at least one gap, attaching the said two plates of the mold together with the aid of said primary alignment dowels to form an elongated essentially rectangular cavity, forming, with said primary alignment dowels in place, registration means for aligning the two plates of the mold in precise registration, separating the two plates of the mold sufficiently to allow the primary alignment dowels to be removed from the mold cavity, removing the primary alignment dowels from the mold cavity, re-attaching the two plates of the mold together using said registration means to align the two plates of the mold in precise registration, filling the mold cavity with molding compound, allowing the mold compound to solidify, separating the plates of the mold, and removing the molded connector part.

2. The method of claim 1 wherein the alignment dowels are cylindrical rods.

3. The method of claim 2 wherein the diameter of the cylindrical rods is approximately equal to the thickness of said elongated rectangular cavity as measured from the surface of the gap on one plate to the surface of the gap on the other plate.

4. The method of claim 3 wherein the elongated rectangular cavity has a thickness in the range of 250 to 8000 microns.

5. The method of claim 1 in which the step of forming the registration means comprises forming at least two holes through both plates in precise registration with one another said holes adapted for insertion of alignment pins.

6. A method for making a mold for a fiber waveguide cable connector part said mold having at least two plates, two plates of which are essentially replicas of each other, each plate having a hollowed portion with a mold pattern formed therein, the hollowed portion of each plate adapted to form a mold cavity when the plates are mated together, the mold pattern of each plate comprising an elongated rectangular cavity, and a plurality of essentially v-shaped ridges extending parallel to one another along the length of the cavity leaving elongated planar gaps between the edges of said v-shaped ridges, placing a first primary alignment dowel in a first of said gaps, placing a second primary alignment dowel in a second of said gaps, said second gap being separated from said first gap by at least one gap, attaching the said two plates of the mold together with the aid of said primary alignment dowels to form an elongated essentially rectangular cavity, forming, with said primary alignment dowels in place, registration means for aligning the two plates of the mold in precise registration, separating the two plates of the mold sufficiently to allow the primary alignment dowels to be removed from the mold cavity, removing the primary alignment dowels from the mold cavity, re-attaching the two plates of the mold together using said registration means to align the two plates of the mold in precise registration.

* * * * *